Oct. 6, 1953     T. T. BATHURST     2,654,200
SICKLE BAR TYPE LAWN MOWER
Filed June 13, 1949     2 Sheets-Sheet 1
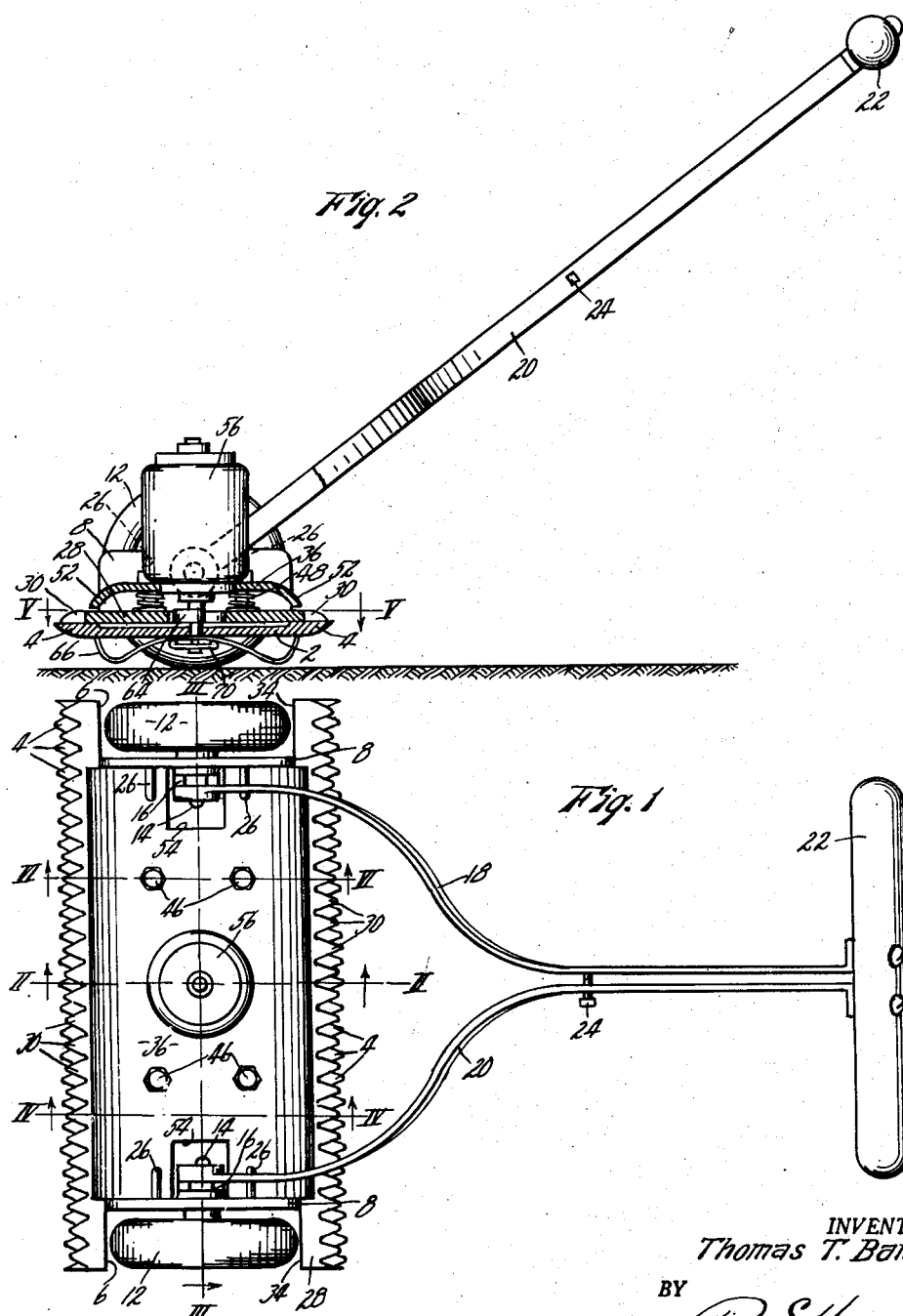
INVENTOR,
Thomas T. Bathurst.
BY
Roy E. Hamilton,
Attorney.

Oct. 6, 1953     T. T. BATHURST     2,654,200
SICKLE BAR TYPE LAWN MOWER
Filed June 13, 1949     2 Sheets-Sheet 2
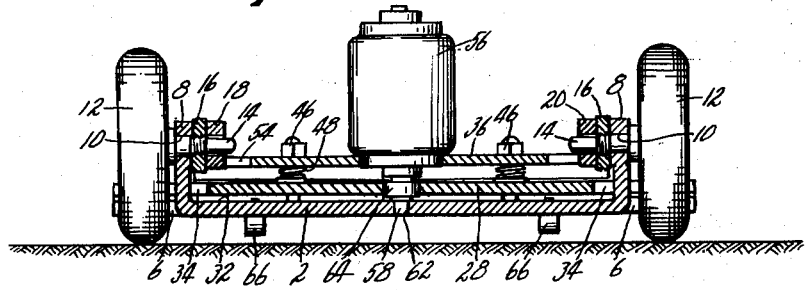
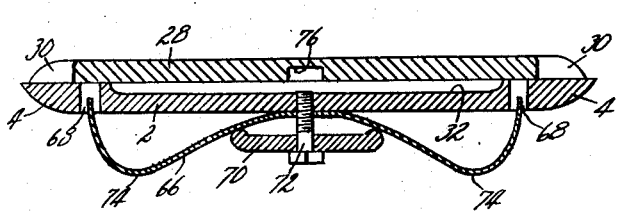
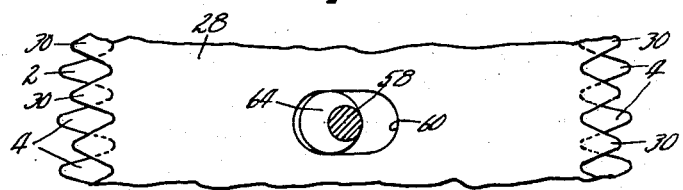
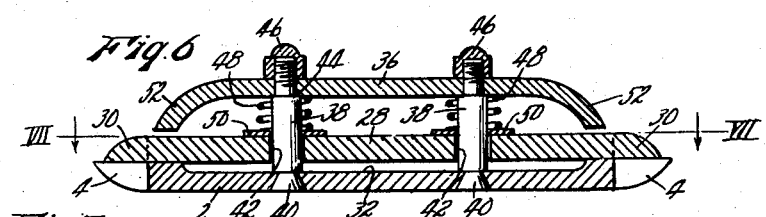
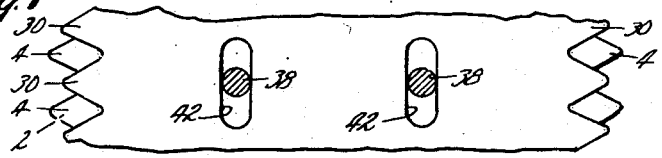
INVENTOR,
Thomas T. Bathurst.
BY
Roy E. Hamilton,
Attorney.

Patented Oct. 6, 1953

2,654,200

UNITED STATES PATENT OFFICE 2,654,200

SICKLE BAR TYPE LAWN MOWER

Thomas T. Bathurst, Miami, Fla., assignor to Roy Randall and Claude O. Fields, both of Kansas City, Mo.

Application June 13, 1949, Serial No. 98,705

8 Claims. (Cl. 56—26.5)

This invention relates to new and useful improvements in lawn mowers, and has particular reference to lawn mowers of the sickle-bar type.

The principal object of the present invention is the provision of a lawn mower of the sickle-bar type having a ledger plate and cutter bar extending transversely to the line of travel of the mower and toothed along both the forward and rearward edges thereof, whereby the mower will function when moved in either direction.

Another object is the provision of a lawn mower of the class described having a double edge sickle-bar cutter arrangement and ground engaging wheels disposed between the edges of the sickle bar and within the end limits thereof, whereby the wheels can not traverse standing grass, but only over grass already cut by the sickle bar.

A further object is the provision of a sickle-bar type lawn mower wherein the cutter assembly is pivoted about an axis above and parallel to the sickle bar, whereby the rearward drag of the grass on the cutter assembly will pivot the sickle bar toward the ground, and adjustable means for limiting said pivoted movement.

A still further object is the provision of means for overriding the dragging force of the grass on the cutter assembly whenever desired.

Other objects are simplicity and economy of construction, convenience and dependability of operation, and adaptability to cut grass at any desired height.

With these objects in view, as well as other objects which will appear in the course of the specification, reference will be had to the drawing, wherein—

Figure 1 is a plan view of a lawn mower embodying the present invention.

Fig. 2 is a sectional view taken on line II—II of Fig. 1, with parts left in elevation.

Fig. 3 is a sectional view taken on line III—III, with parts left in elevation.

Fig. 4 is an enlarged section taken on line IV—IV of Fig. 1, with the cap plate omitted.

Fig. 5 is an enlarged fragmentary section taken on line V—V of Fig. 2.

Fig. 6 is an enlarged section taken on line VI—VI of Fig. 1.

Fig. 7 is a fragmentary section taken on line VII—VII of Fig. 6.

Like reference numerals apply to similar parts throughout the several views, and the numeral 2 applies to a ledger plate disposed transversely to the line of travel of the mower and having serrated teeth 4 formed along both the forward and rear edges thereof. An inwardly extending notch 6 is formed in each end of said ledger plate intermediate the front and rear edges thereof, and at the inner edge of said notch said ledger plate is formed to present an upwardly extending flange 8. Each of said flanges is provided with a bore 10 spaced substantially above the plane of ledger plate 2 and midway between the forward and rearward edges of said ledger plate, said bores also being coaxial and parallel to the toothed edges of said ledger plate. A ground engaging wheel 12 is disposed in each of notches 6 entirely within the end limits of the ledger plate, each of said wheels being carried rotatably in an inwardly extending stub axle 14. Said axle is journaled for free rotation in bore 10 of the adjacent flange 6, whereby ledger plate 2 is supported above the ground. Said axles are retained in said bores by nuts 16 threaded on axles 14 adjacent the inner surfaces of flanges 8.

A pair of handle members 18 and 20 by means of which the mower may be propelled manually over the ground are fixed at their upper ends to a hand grip 22, extend in closely spaced apart relation for a distance from said hand grip, and are widely spaced apart at their lower ends and bored coaxially to fit pivotally over the inwardly extended ends of axle 14. Said handles may be of sufficient resilience to permit their lower ends to be sprung together sufficiently to permit their engagement with axles 14. A screw 24 is threaded in handle member 20 and bears at its end against handle member 18. Said screw may be extended to urge the lower ends of the handle members apart, thereby providing a more positive engagement of the handle members on axles 14. The pivotal movement of the handle on axles 14 is limited by stop pins 26 fixed in flanges 8 and extending into the path of handle members 18 and 20 adjacent axles 14. Preferably said stop pins permit the handle to be pivoted equal amounts on either side from the vertical, in order that the lawn mower may be propelled in either direction.

A cutter bar 28 having the form of a plate substantially coextensive with ledger plate 2 is disposed slidably against the upper surface of said ledger plate. Said cutter bar is adapted to be oscillated longitudinally with respect to the ledger plate, or transversely with relation to the line of travel of the mower, and is provided with serrated teeth 30 along the forward and rearward edges thereof adapted to cooperate with teeth 4 of the ledger plate to cut grass introduced between said teeth, in the manner of an ordinary sickle-bar cutter. The upper surface of the ledger plate is recessed as at 32 so that substantially only the toothed edge portions thereof contact the cutter bar, thereby reducing the frictional resistance to oscillation of the cutter bar and insuring close cooperation of the cutting teeth. It will be noted that teeth 4 of the ledger plate extend slightly beyond the ends of teeth 30 of the cutter bar to prevent injuries in case the operator should contact the teeth with a portion of his body, and to prevent damage to the blades in case they should be run against a tree or the like. An inwardly extending notch 34 is provided in each end of cutter bar 28 to accommodate wheels 12, said notches being of a greater depth than the corresponding notches 6 of ledger plate 2 to permit oscillation of the cutter bar without interference with flanges 8 of the ledger plate.

A cover plate 36 is disposed in spaced relation above cutter bar 28, being rigidly secured to ledger plate 2 by a plurality of bolts 38. Each of said bolts, as best shown in Figs. 6 and 7, has a rivet head 40 rigidly fixed in ledger plate 2, and extends upwardly through a longitudinally elongated slot 42 formed in cutter bar, thereby permitting free oscillation of said cutter bar. Adjacent its upper end, each bolt 38 is provided with a shoulder 44 against which cover plate 36 rests, and against which said cover plate is rigidly secured by a nut 46 carried on the bolt against the upper surface of the cover plate. A helical spring 48 is disposed on each bolt 38 between the cutter bar and cover plate, said spring bearing at its upper end against said cover plate and at its lower end against a washer 50 bearing against the upper surface of cutter bar 28. Said cutter bar is thus urged firmly against the ledger plate. The forward and rearward edge portions of cover plate 36 are curved downwardly as at 52 to a point closely spaced apart from the cutter bar, so that grass cut as the mower operates will pass smoothly over the upper surface of the cover plate and fall from the rearward edge of the mower. Said cover plate is notched at its ends as at 54 so as not to interfere with the engagement of handle members 18 and 20 on axles 14.

A motor 56 is fixed centrally in cover plate 36. The shaft 58 of said motor, as best shown in Figs. 3 and 5, extends vertically downwardly through a transversely elongated slot 60 formed in cutter bar 28, and is journaled in a socket 62 formed therefor in ledger plate 2. A round eccentric 64 is fixed on said motor shaft within said slot and slidably engages the walls of said slot, whereby when said motor is operated, said eccentric will function to oscillate cutter bar 28 longitudinally.

A pair of leaf spring members 66 are carried against the lower surface of ledger plate 2, spaced outwardly from motor 56 toward wheels 12. Each of said spring members extends forwardly and rearwardly, its midpoint contacting ledger plate 2 at the longitudinal midline thereof. The end portions of the spring member are curved downwardly toward the ground, then upwardly toward the ledger plate. Holes 68 may be provided in said ledger plate for receiving the ends of the spring, as best shown in Fig. 4. Said spring member is affixed to the ledger plate by a pressure plate 70 and a screw 72. The forward and rearward edges of said pressure plate contact spring 66 at points spaced apart from the ledger plate, and screw 72 extends through said pressure plate, through said spring, and is threaded into the ledger plate. Thus it is apparent that as screws 72 are adjusted, the lowermost points 74 of spring 66 will be moved toward or away from the ground. A recess 76 is provided in the lower surface of cutter bar 28 for receiving the end portion of screw 72.

In operation, the mower is moved manually over the ground in the usual manner. The cutter assembly, including the cutter bar, ledger plate, motor, and spring members 66, hangs for free pivotal movement from axles 14, and is substantially balanced so that the cutter bar and ledger plate are normally horizontal. As the mower is moved, the grass entering between teeth 4 and 30 at the leading edge of the mower causes a rearward force or drag on the cutter assembly, causing it to pivot about axles 14 to bring the leading edge of the mower closer to the ground. This movement is arrested by the contact of springs 66 with the ground, and thereafter the mower cuts the grass at a uniform height. Springs 66 move in sliding contact with the grass in the manner of runners. By adjusting screws 72, springs 66 may be adjusted to permit variations of the height at which the grass is cut. If for any reason it is desirable to elevate the leading edge of the mower momentarily, as for example to pass over an obstruction, the operator merely lowers the handle until members 18 and 20 thereof strike stop pins 26. Since said stop pins are rigidly associated with the ledger plate 2, the dragging effect of the grass on the pivoted cutter assembly is thereby overridden and the leading edge of the mower is elevated.

Thus a lawn mower having several advantages has been produced. It automatically assumes the proper position to cut grass at any predetermined height whenever it is put in operation. It may be operated with equal efficiency in either direction. Its supporting wheels are disposed entirely within the limits of the cutting members so that they can not traverse standing grass. It is simple and economical in construction, rugged and not likely to get out of order.

Although I have shown a specific embodiment of my invention, it is apparent that many minor variations of construction and operation could be made without departing from the spirit of the invention.

What I claim is:

1. A lawn mower comprising a cutter assembly having cooperating shearing members along the forward and rearward edges thereof, and supporting members from which said cutter assembly is supported for pivotal movement about an axis intermediate, above, and parallel to the forward and rearward edges of said cutter assembly, whereby when said lawn mower is moved in either direction, the rearward drag of the grass being cut will pivot the leading edge of the cutter assembly downwardly toward the ground, a handle for propelling said lawn mower over the ground, said handle being pivotally secured to said supporting members at the pivotal axis of said cutter assembly, and stops carried by said cutter assembly and adapted to limit the pivotal movement of said handle relative to said cutter assembly.

2. A lawn mower comprising a cutter assembly having cooperating shearing members along the forward and rearward edges thereof, and supporting members carrying said cutter assembly for free pivotal movement about an axis intermediate, above, and parallel to the forward and rearward edges of said cutter assembly, whereby when said lawn mower is moved in either direction, the rearward drag of the grass being cut will pivot the leading edge of the cutter assembly downwardly toward the ground, a propelling handle pivotally secured to said supporting members at the pivotal axis of said cutter assembly, and ground engaging members carried by said cutter assembly and adapted by contact with the ground to limit the pivotal movement of said cutter assembly.

3. A lawn mower comprising a cutter assembly having cooperating shearing members along the forward and rearward edges thereof, and supporting members carrying said cutter assembly for free pivotal movement about an axis intermediate, above, and parallel to the forward and rearward edges of said cutter assembly, whereby when said lawn mower is moved in either direction, the rearward drag of the grass being cut will pivot the leading edge of the cutter assembly downwardly toward the ground, a propelling handle pivotally secured to said supporting members at the pivotal axis of said cutter assembly, stops carried by said cutter assembly and apated by contact with the ground to limit the pivotal movement of said cutter assembly, and means for adjusting said stops to adjust the height of the leading edge of the cutter assembly above the ground.

4. A lawn mower comprising a ledger plate extending transversely to the line of travel of the lawn mower and having serrated teeth along its forward and rearward edges, a horizontal axle carried rotatively at each end of said ledger plate, said axles being coaxial and being parallel to and above the mid-line of said ledger plate, a ground engaging wheel carried on each of said axles and supporting said ledger plate above the ground, a cutter bar disposed in sliding contact with the upper surface of said ledger plate and having teeth along its forward and rearward edges adapted to move in shearing relation with the teeth of said ledger plate, and means for oscillating said cutter bar relative to said ledger plate transversely to the direction of travel of the mower, said ledger plate normally hanging freely in a horizontal position from said axles, and the leading edge thereof being adapted when the mower is moved either forwardly or rearwardly to be pivoted downwardly toward the ground by the rearward drag of the grass being cut.

5. A lawn mower comprising a ledger plate extending transversely to the line of travel of the lawn mower and having serrated teeth along its forward and rearward edges, a horizontal axle carried rotatively at each end of said ledger plate, said axles being coaxial and being parallel to and above the midline of said ledger plate, a ground engaging wheel carried on each of said axles and supporting said ledger plate above the ground, a cutter bar disposed in sliding contact with the upper surface of said ledger plate and having teeth along its forward and rearward edges adapted to move in shearing relation with the teeth of said ledger plate, and means for oscillating said cutter bar relative to said ledger plate transversely to the direction of travel of the mower, said ledger plate normally hanging freely in a horizontal position from said axles, and the leading edge thereof being adapted when the mower is moved either forwardly or rearwardly to be pivoted downwardly toward the ground by the rearward drag of the grass being cut, and adjustable stops carried by said ledger plate and adapted to contact the ground to limit the pivotal movement of said ledger plate.

6. A lawn mower comprising a ledger plate extending transversely to the line of travel of the lawn mower and having serrated teeth along its forward and rearward edges, a horizontal axle carried rotatively at each end of said ledger plate, said axles being coaxial and being parallel to and above the midline of said ledger plate, a ground engaging wheel carried on each of said axles and supporting said ledger plate above the ground, a cutter bar disposed in sliding contact with the upper surface of said ledger plate and having teeth along its forward and rearward edges adapted to move in shearing relation with the teeth of said ledger plate, and means for oscillating said cutter bar relative to said ledger plate transversely to the direction of travel of the mower, and a handle carried pivotally on said axles whereby said lawn mower may be manually propelled in either direction.

7. A lawn mower comprising a ledger plate extending transversely to the line of travel of the lawn mower and having serrated teeth along its forward and rearward edges, a horizontal axle carried rotatively at each end of said ledger plate, said axles being coaxial and being parallel to and above the midline of said ledger plate, a ground engaging wheel carried on each of said axles and supporting said ledger plate above the ground, a cutter bar disposed in sliding contact with the upper surface of said ledger plate and having teeth along its forward and rearward edges adapted to move in shearing relation with the teeth of said ledger plate, and means for oscillating said cutter bar relative to said ledger plate transversely to the direction of travel of the mower, said ledger plate normally hanging freely in a horizontal position from said axles, and the leading edge thereof being adapted when the mower is moved either forwardly or rearwardly to be pivoted downwardly toward the ground by the rearward drag of the gass being cut, and adjustable stops carried by said ledger plate and adapted to contact the ground to limit the pivotal movement of said ledger plate, and a handle pivotally secured to said axles.

8. A lawn mower comprising a ledger plate extending transversely to the line of travel of the lawn mower and having serrated teeth along its forward and rearward edges, a horizontal axle carried rotatively at each end of said ledger plate, said axles being coaxial and being parallel to and above the midline of said ledger plate, a ground engaging wheel carried on each of said axles and supporting said ledger plate above the ground, a cutter bar disposed in sliding contact with the upper surface of said ledger plate and having teeth along its forward and rearward edges adapted to move in shearing relation with the teeth of said ledger plate, and means for oscillatnig said cutter bar relative to said ledger plate transversely to the direction of travel of the mower, said ledger plate normally hanging freely in a horizontal position from said axles, and the leading edge thereof being adapted when the mower is moved either forwardly or rearwardly to be pivoted downwardly toward the ground by the rearward drag of the gess being cut, and adjustable stops carried by said ledger plate and adapted to contact the ground to limit the pivotal movement of said ledger plate, and a handle pivotally secured to said axles, and stops carried by said ledger plate for limiting the pivotal movement of said handle relative to said ledger plate.

THOMAS T. BATHURST.

(References on following page)

References Cited in the file of this patent

UNITED STATES PATENTS

| Number | Name | Date |
|---|---|---|
| 314,988 | Bearly | Apr. 7, 1885 |
| 700,173 | Clifton | May 20, 1902 |
| 1,048,404 | Gerritz | Dec. 24, 1912 |
| 1,403,895 | Copeland | Jan. 17, 1922 |
| 1,546,088 | Landon | July 14, 1925 |
| 1,716,085 | Perkins | June 4, 1929 |
| 1,832,993 | Masek | Nov. 24, 1931 |
| 1,868,347 | Cloud | July 19, 1932 |
| 1,919,516 | Koch | July 25, 1933 |
| 2,288,498 | Underwood | June 30, 1942 |
| 2,332,557 | Carillo et al. | Oct. 26, 1943 |
| 2,351,460 | Shelton | June 13, 1945 |